United States Patent [19]

Ulbing

[11] Patent Number: 4,506,424
[45] Date of Patent: Mar. 26, 1985

[54] AUTOMATED RAILROAD BEARING HANDLING MACHINE

[75] Inventor: Otmar Ulbing, Fairport, N.Y.

[73] Assignee: USM Corporation, Farmington, Conn.

[21] Appl. No.: 426,835

[22] Filed: Sep. 29, 1982

[51] Int. Cl.³ .............................................. B23P 19/04
[52] U.S. Cl. .................................... 29/252; 33/178 E
[58] Field of Search ................. 29/252, 251, 802, 803; 33/178 E

[56] References Cited

U.S. PATENT DOCUMENTS

| | | |
|---|---|---|
| 2,906,012 | 9/1959 | Rothfuchs et al. .................... 29/252 |
| 3,189,985 | 6/1965 | Hoffman ............................ 29/252 X |
| 3,399,447 | 9/1968 | Hegedus et al. ...................... 29/251 |
| 3,916,499 | 11/1975 | Frame et al. ...................... 29/252 X |
| 4,192,054 | 3/1980 | Webb .................................. 29/252 |

Primary Examiner—Frederick R. Schmidt
Assistant Examiner—Steven P. Schad
Attorney, Agent, or Firm—Vincent A. White

[57] ABSTRACT

A machine for removing and installing bearings on the ends of wheel sets including a gage for measuring wheel size and for aligning the wheel sets with bearing removing or installing devices according to wheel size and for transporting the bearings automatically to and from a conveyor.

2 Claims, 22 Drawing Figures

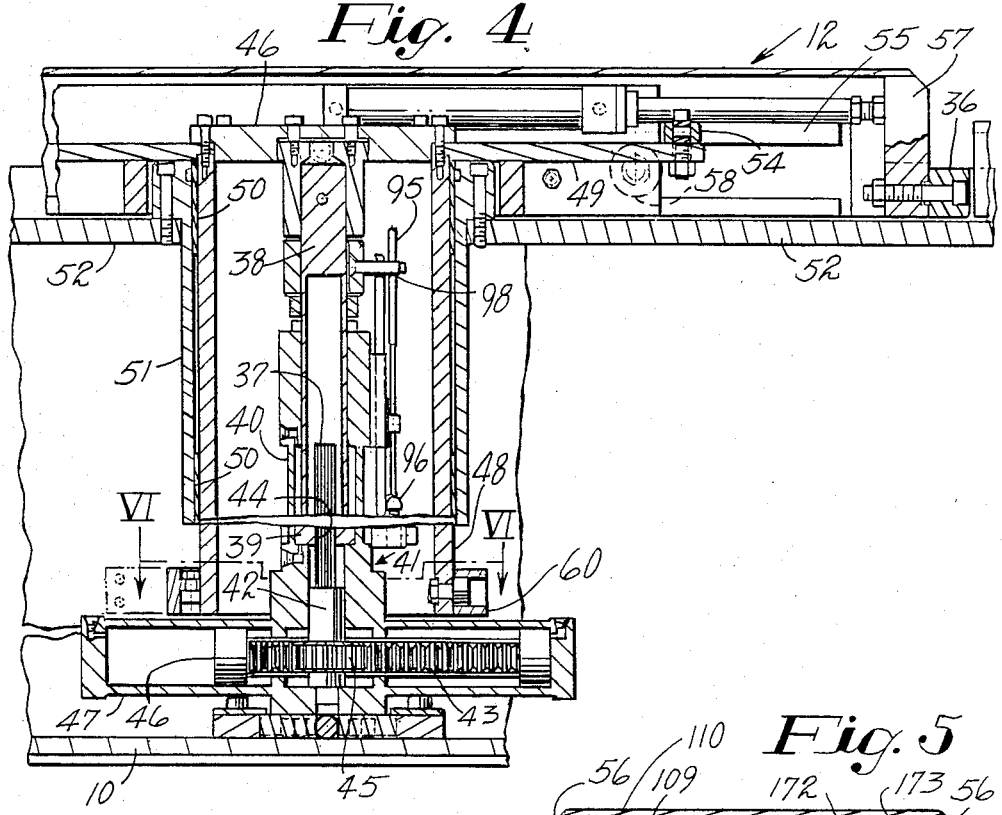
Fig. 4
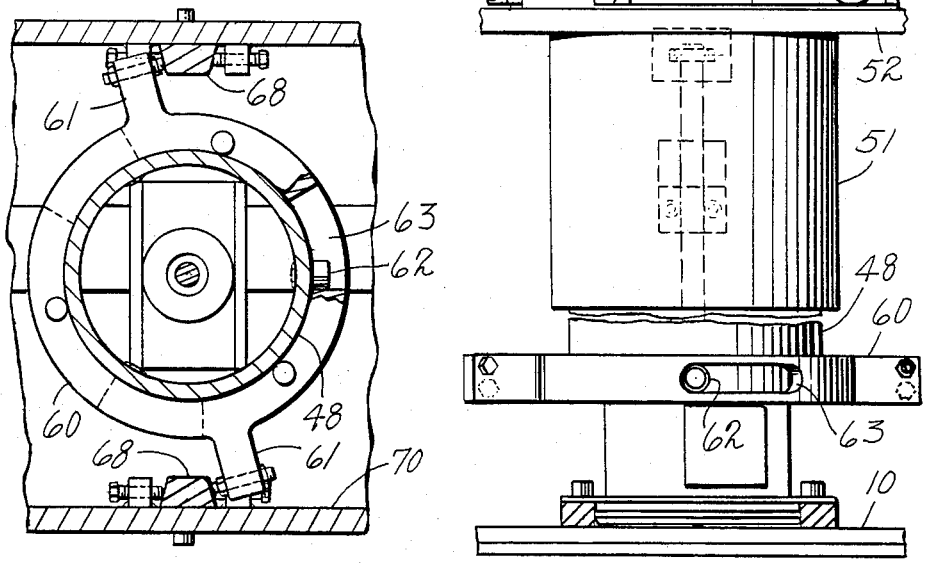
Fig. 5
Fig. 6

Fig. 11
Fig. 12
Fig. 13
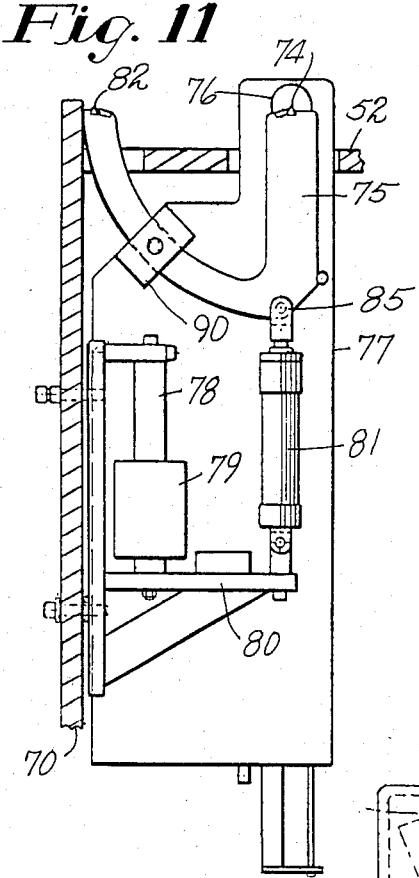
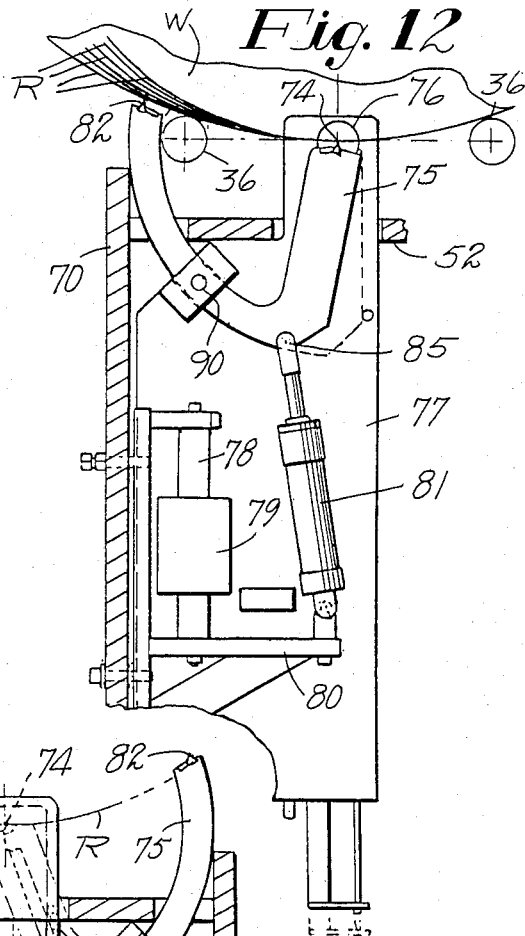
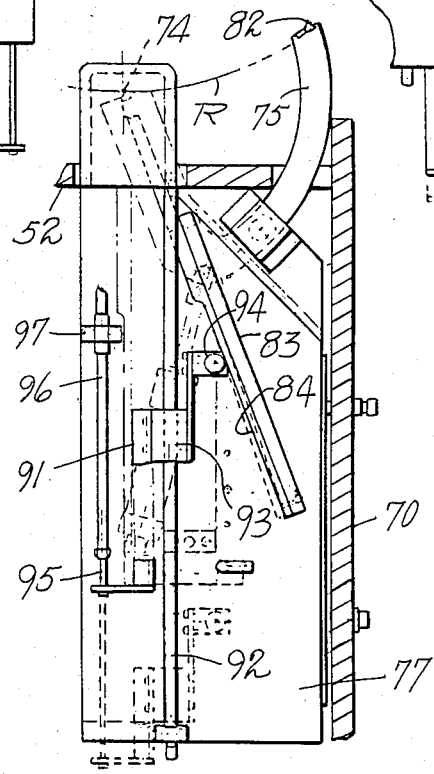

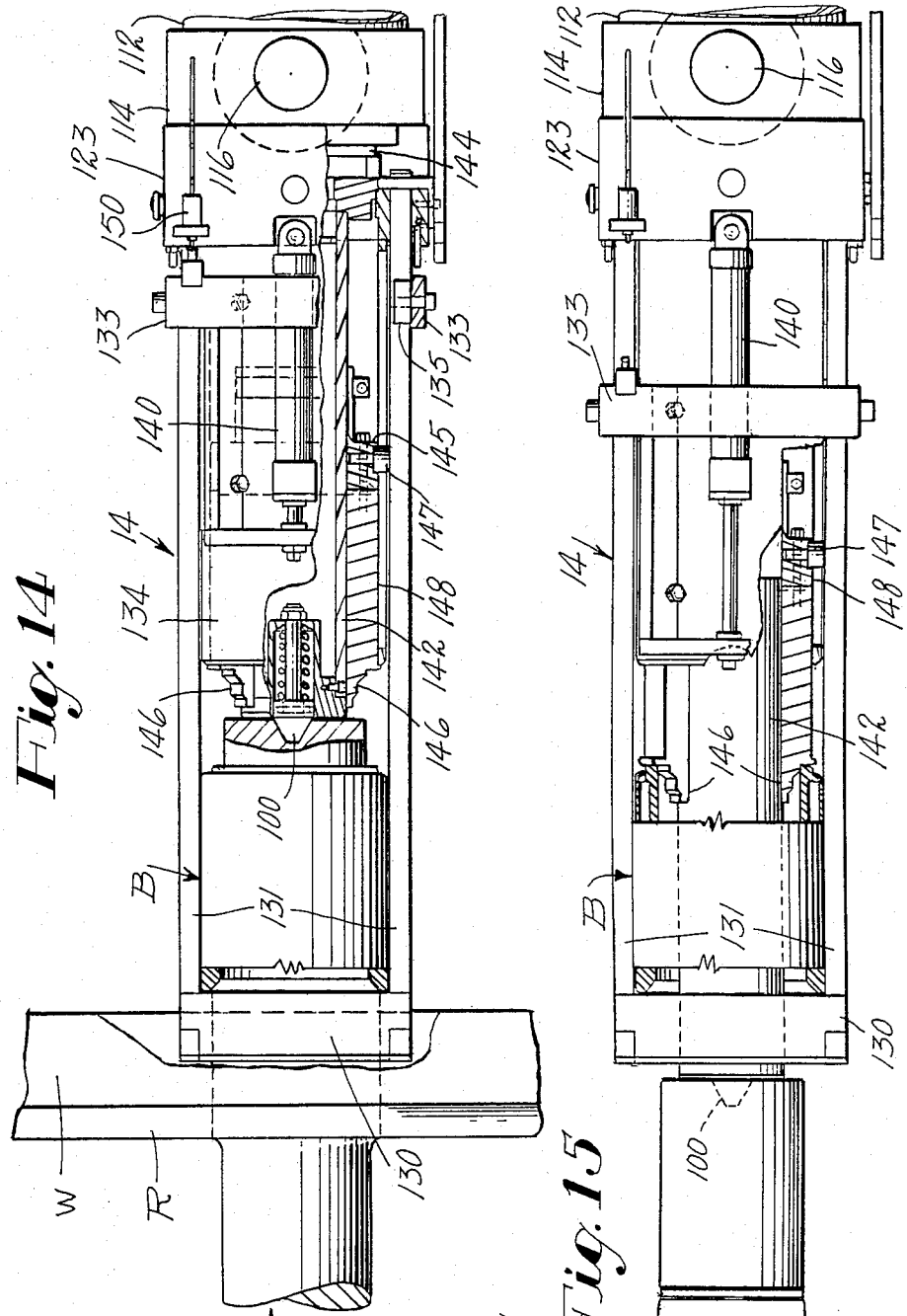

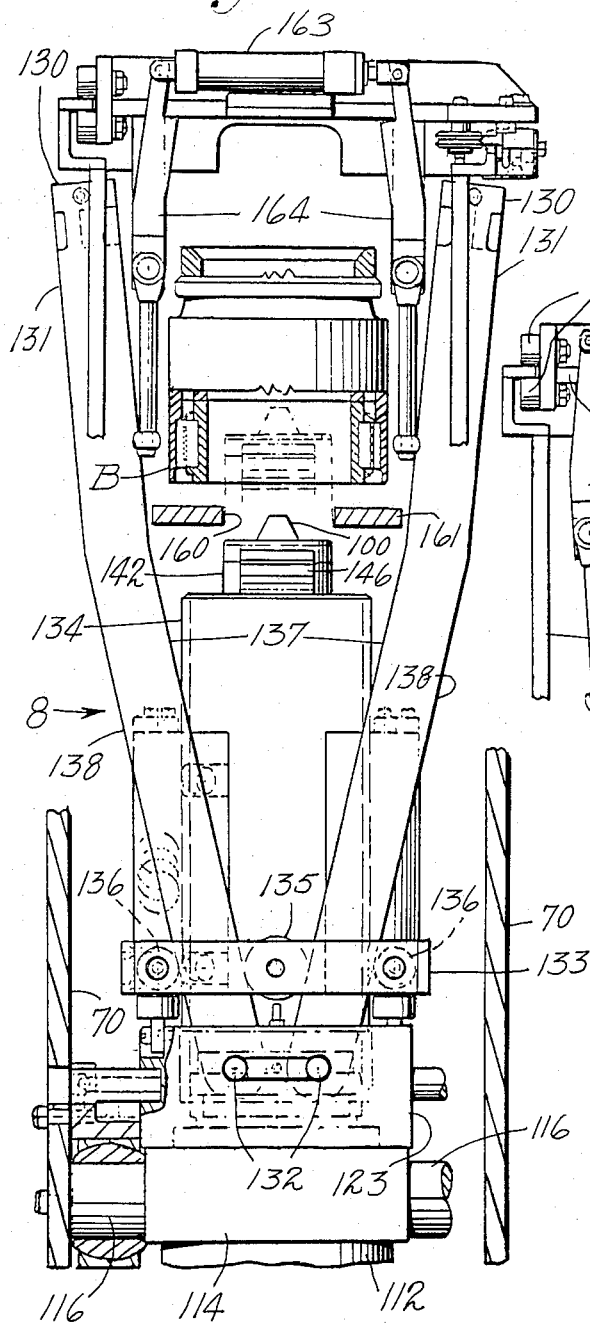
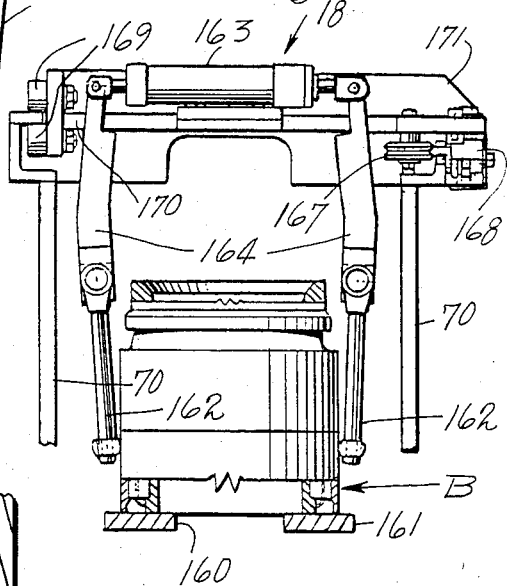
Fig. 18
Fig. 19

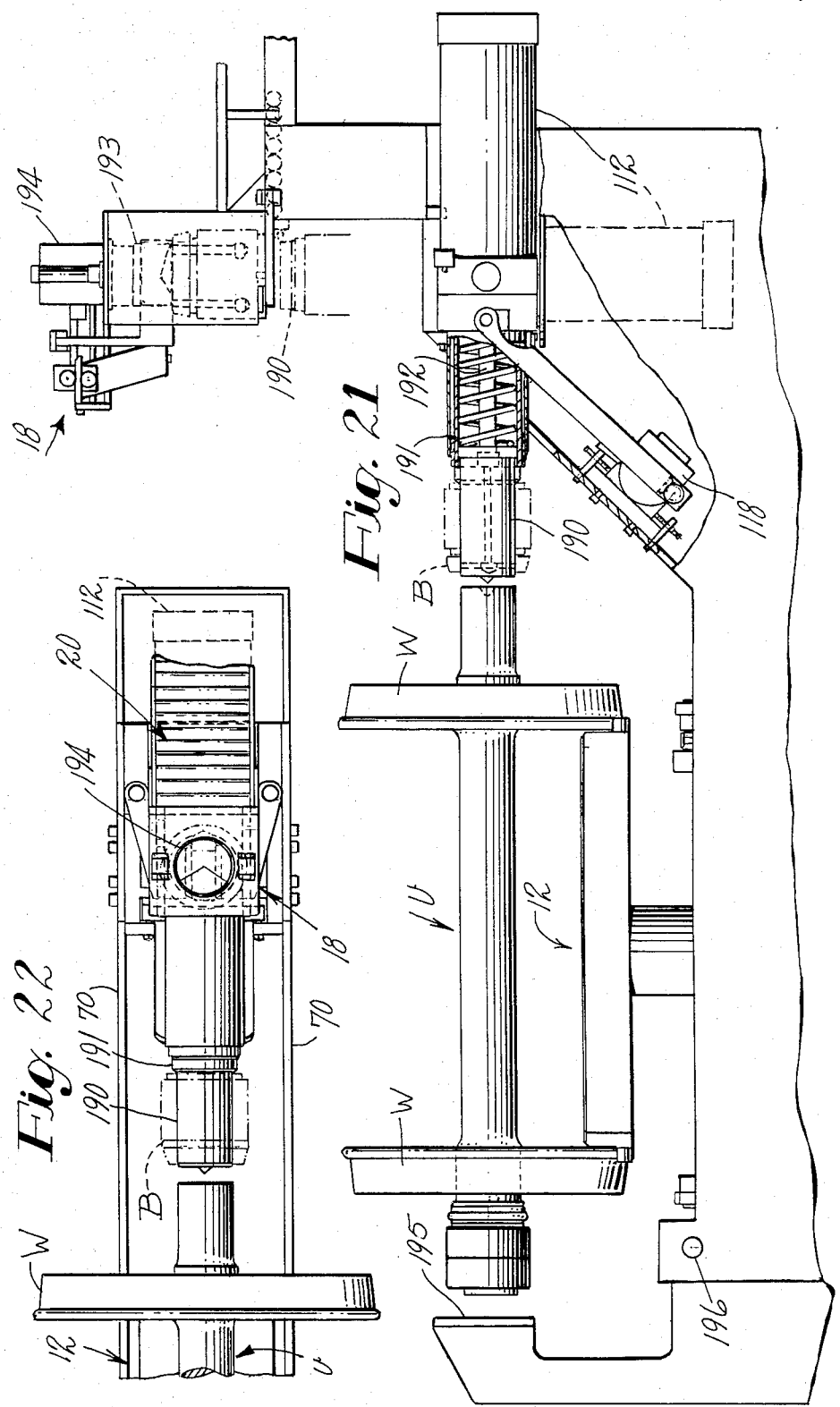

AUTOMATED RAILROAD BEARING HANDLING MACHINE

FIELD OF THE INVENTION

This invention relates to machinery for removing and installing railroad wheel set bearings and in particular is related to the automation of such equipment.

DESCRIPTION OF THE PRIOR ART

Railroad wheels are press fitted and located in sets on railroad axles together with bearing units on the ends of the axles. Even though long lasting, the bearings eventually become worn or damaged usually before the wheels require replacement. The axle-wheel-bearing assembly must be removed and sent to a wheel shop where the bearings are removed from the axles usually by manual bearing pullers and replaced with much labor. The problems encountered are aggravated because the wheel sets and bearings are heavy and cumbersome and must be handled by manually controlled heavy equipment.

There has been equipment provided for an automated railroad wheel shop as described in U.S. Pat. No. 3,085,311 primarily for reconditioning wheels and axles. As described, unmounted wheels and axles are matched for boring the wheels according to the wheel seat diameters and the matched sets are press fitted. None of the locating and measuring devices of such equipment are suitable for use in the present apparatus which must handle a variety of sizes of wheels which are already mounted on the axles and then automatically elevate and align each wheel set with either a bearing pulling or installing unit.

While some semi-automated machinery for both bearing removal and installation has been available in the past such machinery has been tailored for specific installations and requirements. Such machinery is not suitable for automatic setting for a variety of wheel set sizes or for automatically handling bearings that are removed or installed.

SUMMARY OF THE INVENTION

Accordingly, it is an object of the present invention to provide equipment for removing and installing bearings on railroad wheel sets which are automatically handled according to the size of the wheel set. The present invention provides a novel machine adapted to receive railroad wheel sets which are rolled into the machine on tracks and which are automatically measured and raised into alignment with bearing pulling or installing units. The extent of the elevation required for alignment is dependent on the wheel size of the wheel set being operated on. The bearing pulling and installing units are adapted automatically and in timed sequence to receive new bearings or deliver pulled bearings to a conveyor to which reconditioned or used bearings are supplied. Another feature provides for increasing the versatility of the machine without great expense by providing for simple substitution of pulling and installing units.

DESCRIPTION OF THE DRAWINGS

FIG. 4 is a side elevation partly in section showing the wheel set elevating and swinging mechanisms shown in FIGS. 1, 2 and 3;

FIG. 5 is an end elevation of the parts shown in FIG. 4;

FIG. 6 is a section on line VI—VI of FIG. 4;

FIGS. 11 and 12 are side elevations of the wheel size gaging unit in different positions;

FIG. 13 is an elevation of the unit shown in FIG. 12 from the opposite side;

FIG. 14 is a side view partly in section showing a wheel set aligned with the bearing pulling unit;

FIG. 15 is a view similar to FIG. 14 with the parts in the positions assumed when the bearing is removed;

FIG. 18 is a front elevation of the mechanism shown in FIG. 16 at the bearing escapement mechanism;

FIG. 19 is a view similar to FIG. 18 but showing only the escapement fingers in position gripping a bearing;

FIG. 21 is a side elevation generally similar to FIG. 3 but with a bearing installing unit substituted for the bearing pulling unit; and FIG. 22 is a plan view of part of the machine shown in FIG. 21.

DESCRIPTION OF THE PREFERRED EMBODIMENT

Figure 1:
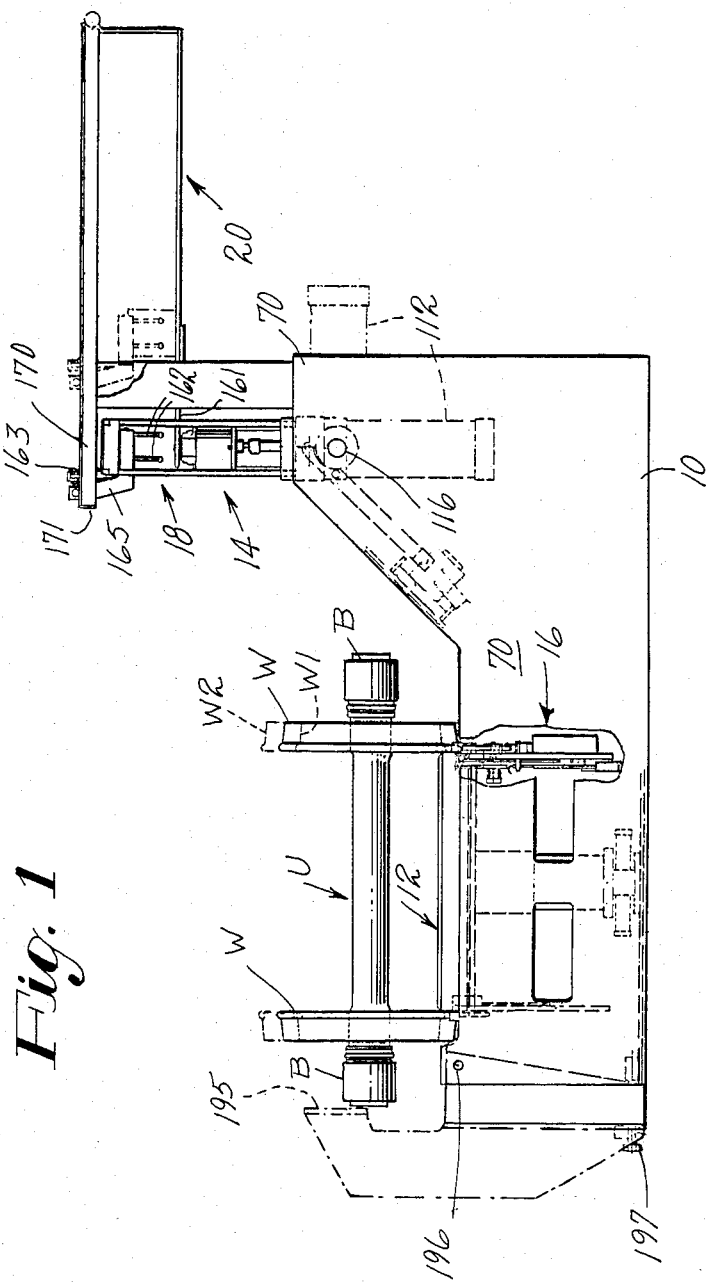
FIG. 1 is a side elevation of an automated railroad wheel set bearing removing and installing machine embodying the present invention.
Figure 10:
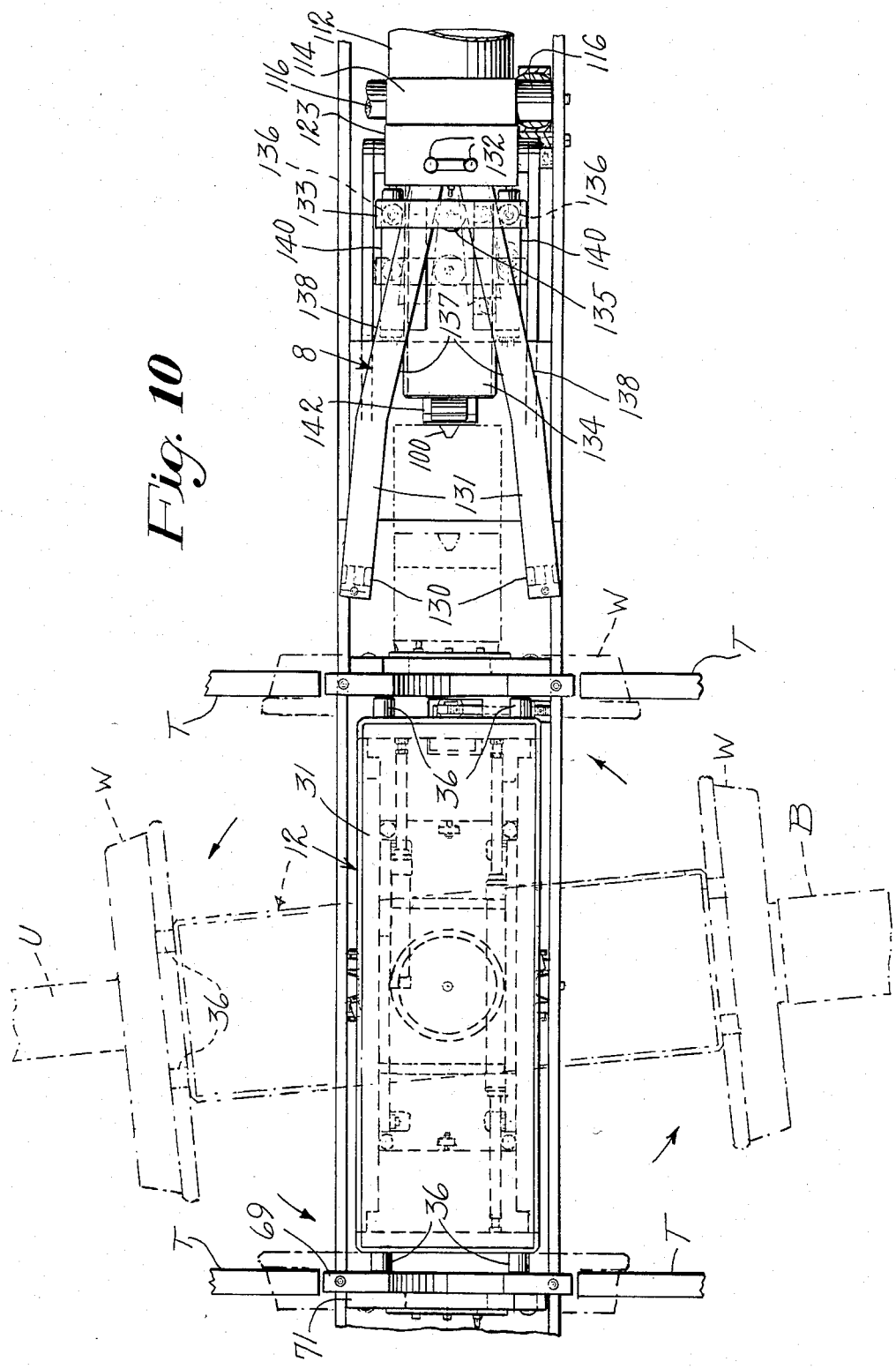
FIG. 10 is a plan view showing the wheel set carriage and the bearing pulling unit.

The machine in general includes a frame 10 (FIG. 1) on which is mounted an elevator and carriage assembly 12. The assembly 12 is adapted to move a railroad wheel and axle unit U heightwise from a track to a location where the axle is aligned with a unit 14 (see also FIG. 3) adapted to remove bearings B from opposite ends of the axle. The extent of the heightwise movement of the axle is controlled by a gage unit 16 adapted to measure the size of the wheels W on the axle to be elevated. As seen in FIG. 1 the size of the wheels W may vary considerably as indicated by solid and broken lines W, W1 and W2. The unit 14 is adapted to remove the bearing B at one end of the axle as indicated in FIGS. 14 and 15 and to swing to a position indicated in FIGS. 1 and 2 where the removed bearing is placed in an escapement unit 18 for disposition by a conveyor 20. After removal of the bearing B the axle is rotated by the carriage 12 as indicated in FIG. 10 180° so that the bearing B at the other end of the axle can be removed by the unit 14. After both bearings are removed, the axle-wheel unit U is lowered to its initial height and rolled on tracks out of the machine.

Figure 2:
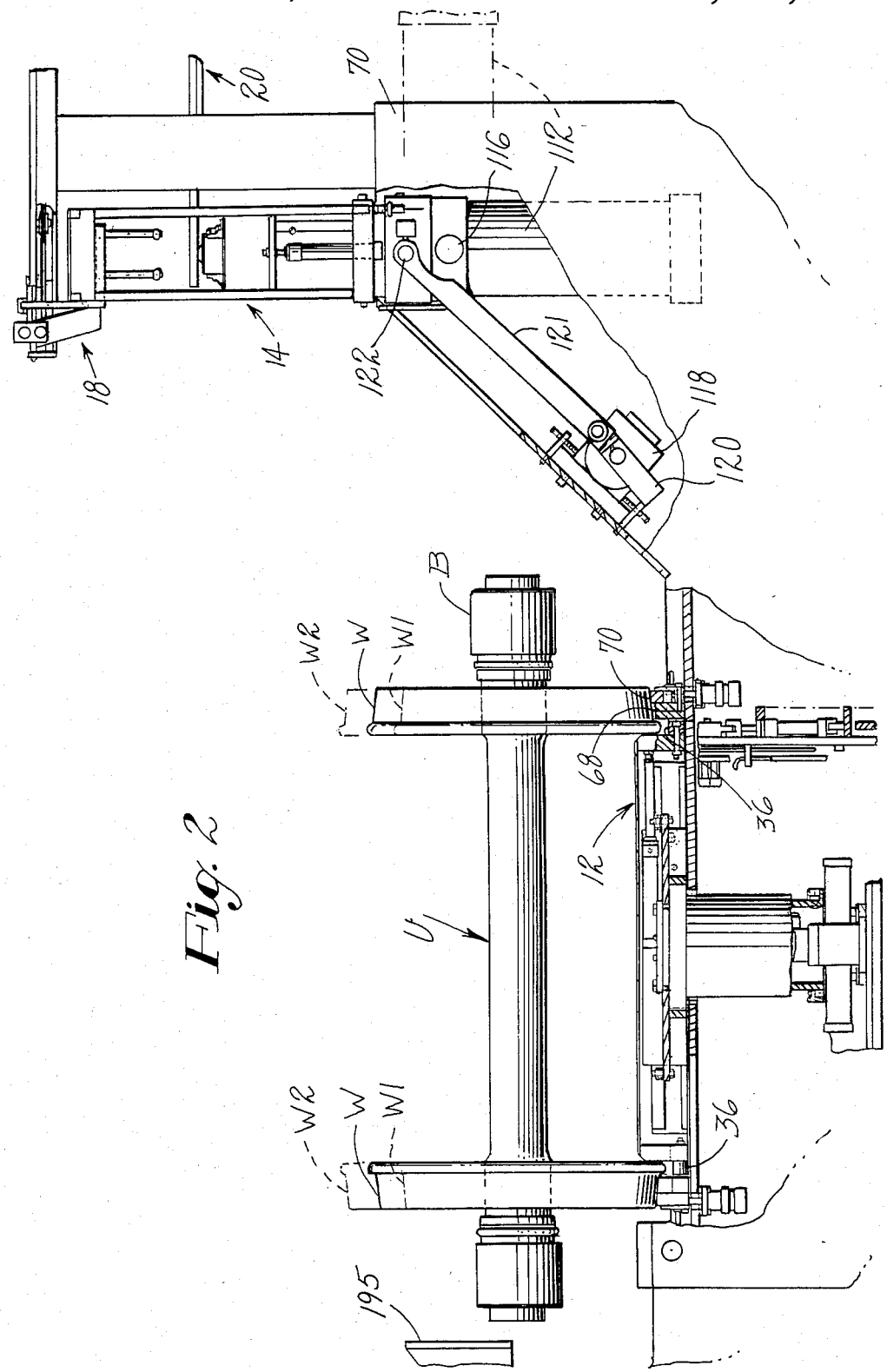
FIG. 2 is an enlarged side elevation, partly in section, of part of the machine shown in FIG. 1.
Figure 8:
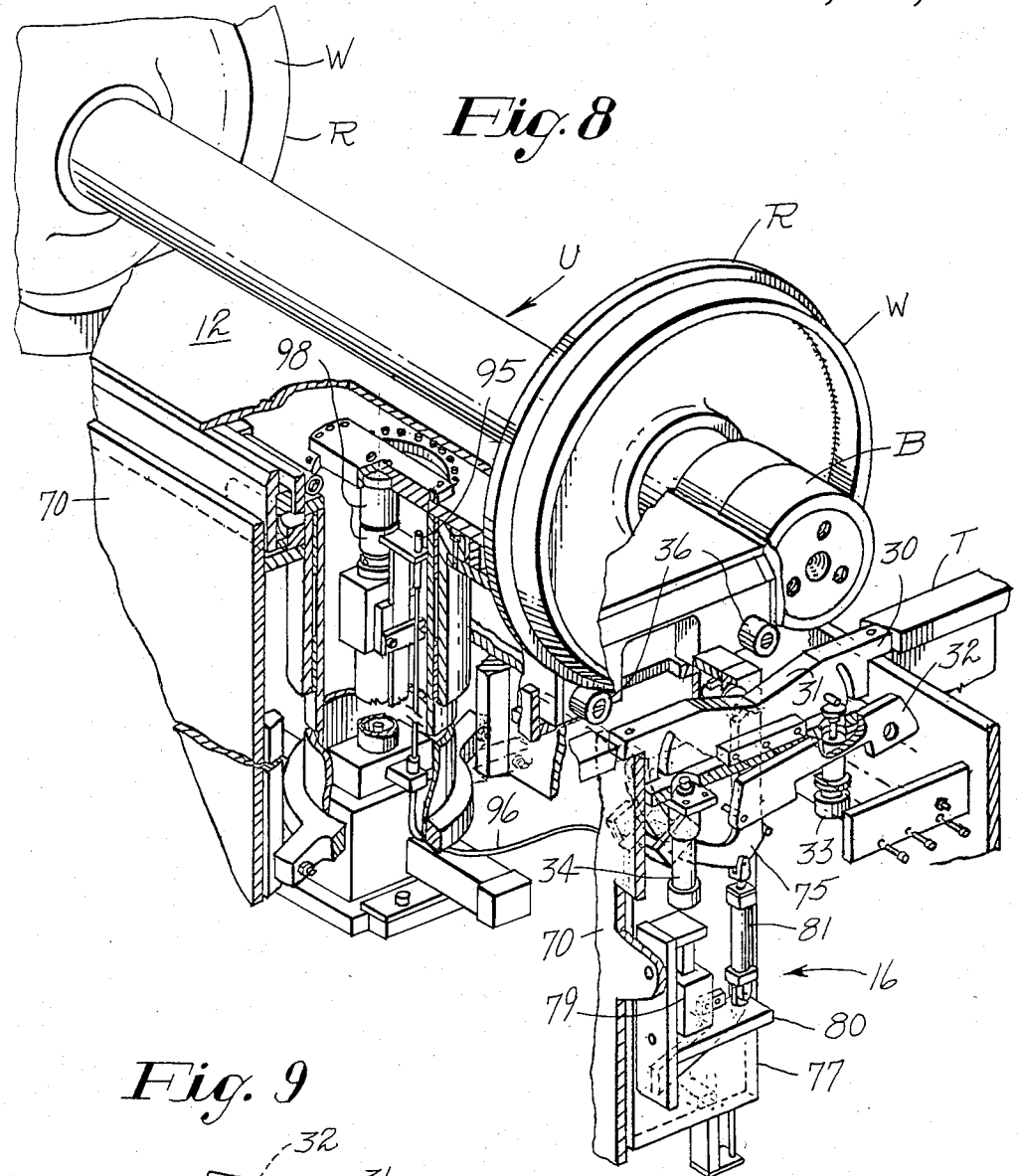
FIG. 8 is a perspective view of the elevating and carriage assembly with a wheel set located thereon together with a wheel size gaging device.
Figure 9:
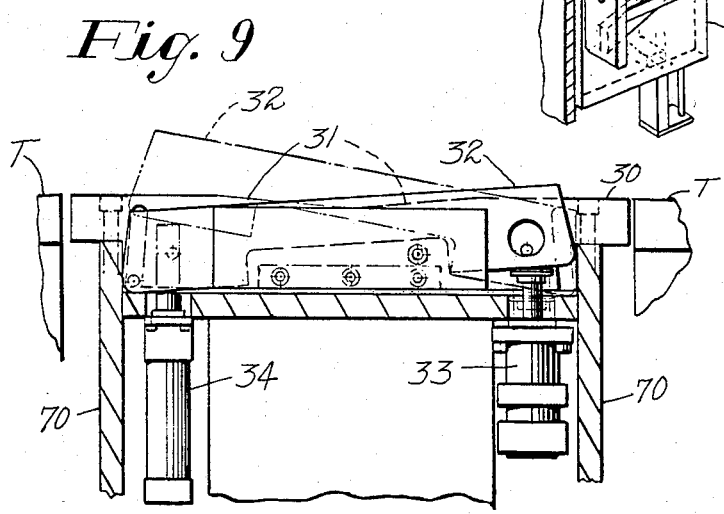
FIG. 9 is an end elevation of the wheel locating parts shown in FIG. 7.

Referring to FIG. 2, the axle and wheel unit U is shown at its initial location where it has been rolled into the machine on tracks T (FIGS. 8–10). Rails 30 having V-shaped depressions 31 (FIGS. 8 and 9) receive the wheels W and control bars 32 supported initially in the position shown in FIG. 9 by shock absorbers 33 act to cushion the incoming wheelset and to lower the wheels W into the depressions 31. The opposite end of each control bar 32 rests on the end of a piston rod extending from a cylinder 34 which is depressurized at this time. In this manner the axle wheel unit U is located in the machine by the wheels W resting in the depressions 31. Thereafter the rim of the wheels W are each engaged by spaced buttons 36 (FIG. 8) extending from opposite ends of the elevator carriage assembly 12 so as to underlie the rims R of the wheels W.

Figure 3:
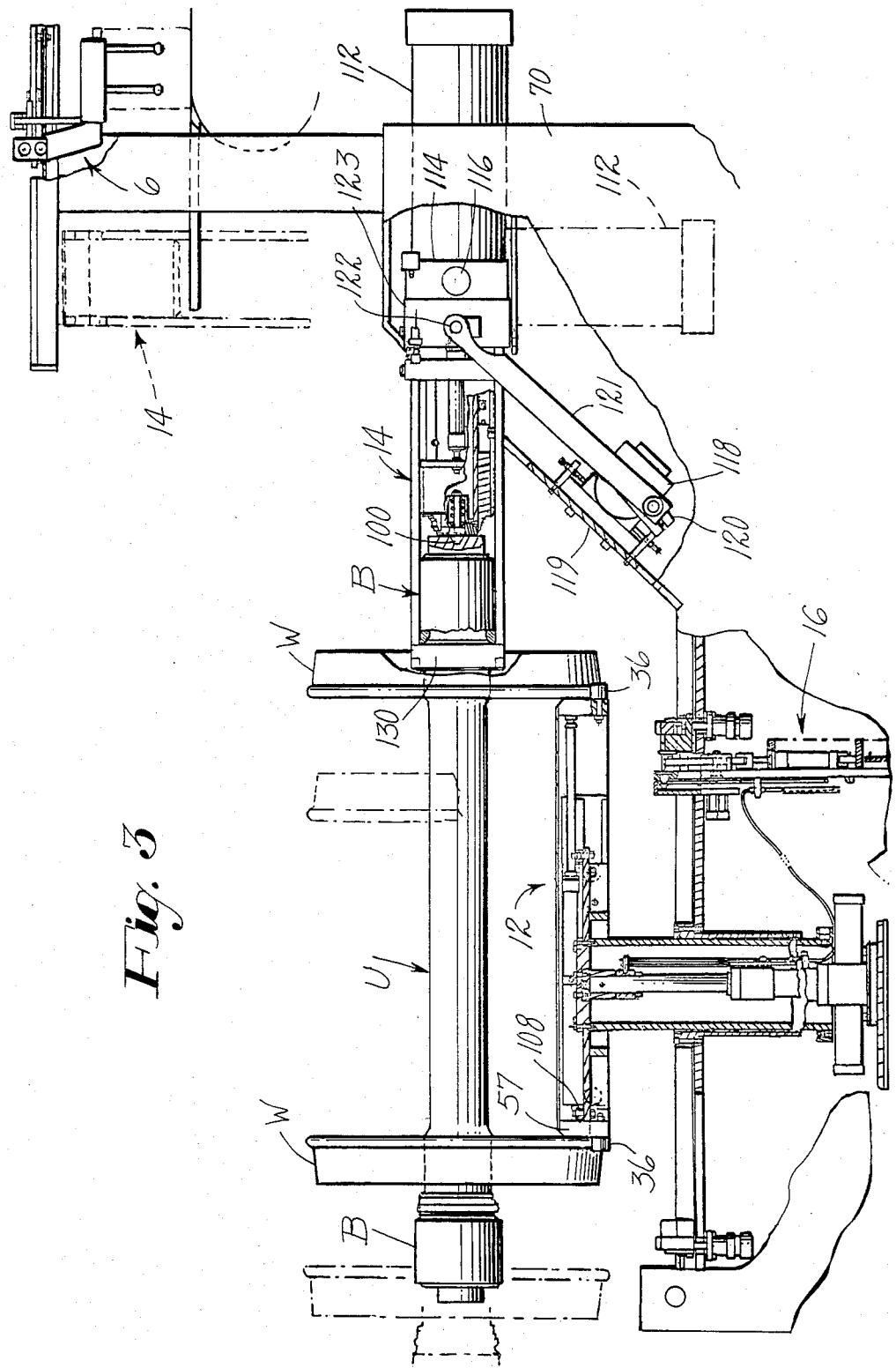
FIG. 3 is a view similar to FIG. 2 showing parts of the machine in different positions.

The elevator and carriage assembly 12 is movable heightwise to a predetermined extent depending on wheel size, as will appear, to align the axis of the axle-wheel unit with the bearing pulling unit 14 as seen in FIG. 3. The assembly also is rotatable 180° to present opposite ends of the axle to the unit as indicated in FIG. 10. To these ends, the assembly 12 is mounted on the upper end of a piston rod 38 extending from a piston 39 in a cylinder 40 as best seen in FIG. 4. The lower end of the cylinder is mounted on a rotary actuator 41 which in turn is fixed to a base of the machine frame 10. The actuator 41 has a splined shaft 42 mounted for rotation therein and which has a splined portion 37 extending upwardly through a splined opening 44 in the piston 39 so as to impart rotary motion to the piston 39 and rod 38 while the splined connection allows the piston and rod to move heightwise independently. The shaft 42 at its lower end has a pinion 45 meshing with a rack 43 having pistons 46 at opposite ends in a double acting cylinder 47 forming part of the actuator 41. By introducing fluid under pressure alternately to the opposite ends of the cylinder 47, the shaft 42 and piston rod 38 are caused to be oscillated. By alternately introducing and exhausting fluid from the opposite ends of cylinder 40 the piston rod 38 is raised and lowered. The upper end of the rod 38 is secured in a composite bracket 46 bolted through a plate 49 to the upper end of a column 48. The column is guided for rotation and reciprocation in bearings 50 of a sleeve 51 bolted to and downstanding from a horizontal plate 52 fixed to the machine frame.

Figure 7:
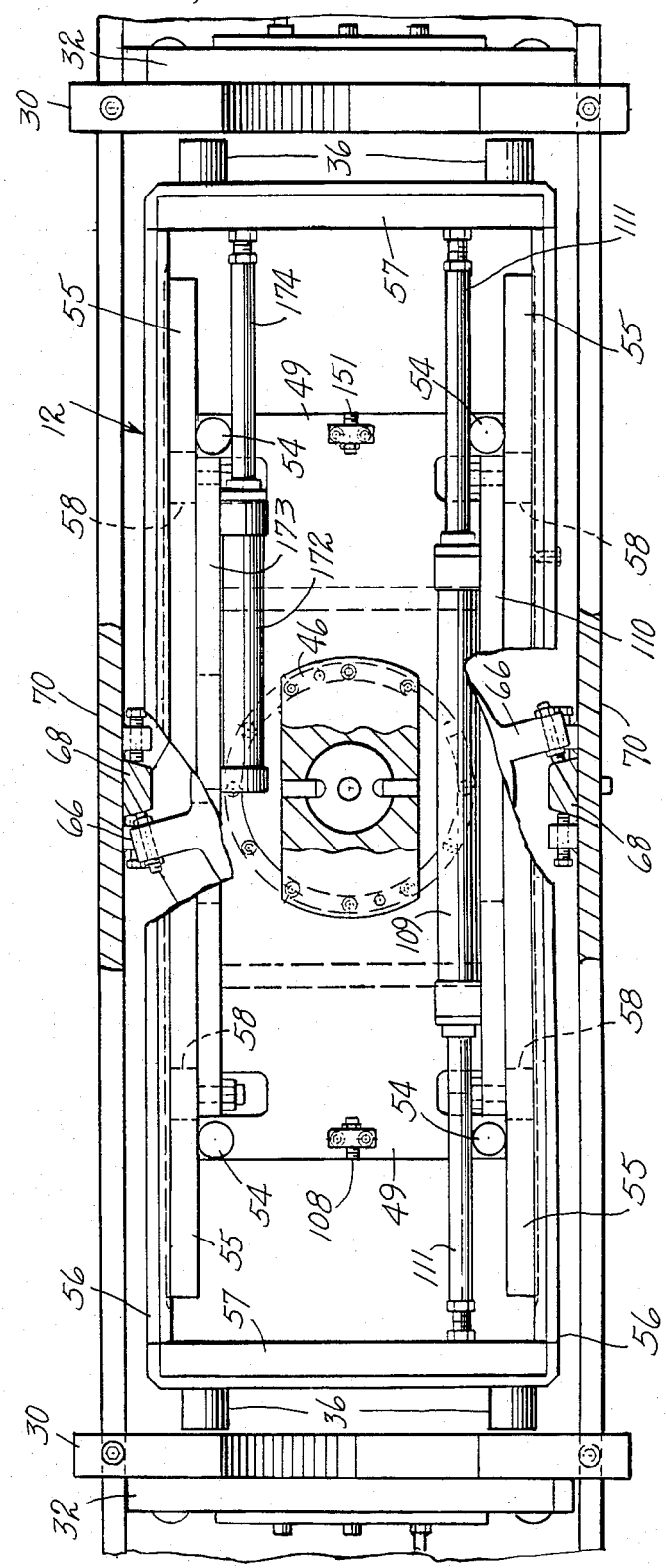
FIG. 7 is a plan view of the mechanism shown in FIGS. 4 and 5 with a cover removed to better show the operating elements.

The plate 49 secured to the upper end of piston rod 38 carries rolls 54 (FIGS. 4–7) which engage bars 55 secured to side plates 56 of the carriage also having end plates 57 which carry the buttons 36. Lugs depending from the plate 49 carry rollers 58 on which rest the underside of the bars 55. Thus, the carriage is reciprocable in a horizontal plane on the elevator plate 49 as guided by the rolls 54 and 58 and partakes of any rotary motion caused by the actuator 41 and heightwise reciprocation caused by the elevator cylinder 40. For limiting the extent of oscillation of the assembly to align the wheel axle unit with the unit 14, the lower end of the column 48 has a collar 60 (see also FIG. 6) mounted thereon for relative oscillation limited by a pin 62 in the column received in a slot 63 in the collar. The collar 60 is provided with arms 61 having adjustable stops arranged to engage stop bars 68 mounted on side frames 70. The arrangement is such that construction errors can easily be compensated for by the lost motion between the collar 60 and column at the pin and slot connector 62, 63 and by the adjustable stops in the arms 61 as well as by adjustment of bars 68 (FIG. 7).

For determining the size of the wheel W of the wheel axle unit U, the gage unit 16 (FIGS. 8 and 11–13) is adapted to engage the rim R of the wheel. As described above, the wheels of the wheel axle unit U are located by the V-shaped depressions in the rails 30 so that the axis of the wheel unit U is generally located along a particular vertical plane. To ensure that both the wheels of the unit U are located in such plane, the elevator 12 is caused to rise to a particular level to engage and slightly lift the rims of both wheels by the buttons 36. At this time, a probe 74 (FIG. 12) of the gage unit is moved into engagement with the rim R. To this end, the probe 74 which lies in the same vertical plane as the axle is formed on a gage plate 75 mounted to swing on a pivot 76 rotatable in a slide plate 77. The plate 77 has a slide 79 moved heightwise on a bar 78 carried by a bracket 80 secured to one of the upright frameplates 70. The gage plate 75 initially is in the position shown in FIG. 11 and is moved heightwise by a cylinder 81 mounted on the bracket 80 and having its piston rod connected to the gage plate at 85. The gage plate is moved up until the probe 74 engages the rim R in the same plane as the unit U whereupon the gage plate swings about the pivot 76 until a secondary probe 82 on the plate also engages the rim R as seen in FIG. 12. A lever 83 (FIG. 13) fixed to the pivot 76 on the other side of the plate 77 is swung in unison with the gage plate 75 so that a gage surface 84 on the lever assumes a particular angular disposition which depends on the extent of the swing of the gage plate to engage both probes 74 and 82 with the rim R. This angular disposition is indicative of the size of the wheel W being gaged. At this point a cylinder 90 is actuated to clamp the gage plate 75 and gage surface 83 from further movement relative to the plate 77. A carriage 91 (FIG. 13) is mounted to slide heightwise along a bar 92 fixed at opposite ends to the plate 77 and carries a limit switch 93 having an actuator 94 arranged to contact the gage surface 84 as it is moved heightwise. The carriage 91 is secured to one end of a cable 95 in a sheath 96 secured at 97 to plate 77. The other end of the cable 95 is secured at 98 (FIG. 4) to the piston rod 38 of the elevator assembly so that the limit switch 93 duplicates the movement of the elevator. When the limit switch 93 is actuated by engagement of its actuator 94 with the gage surface 84, flow of pressure fluid to the lower end of cylinder 40 is cut off to stop heightwise movement of the elevator assembly. Appropriate well known electrical and hydraulic or pneumatic circuits not shown may be utilized to effect such control. In this way the axis of unit U is stopped at a particular level coaxial with a center 100 (FIG. 14) of the bearing pulling unit 14. For a more complete understanding of the operation of the gage unit 16 reference may be had to copending application Ser. No. 427,160, filed Sept. 27, 1983, now U.S. Pat. No. 4,406,067 which is incorporated herein by reference.

After alignment of the wheel axle unit U with the bearing pulling unit 14, the gage is retracted and the wheel set U is moved to the right as seen in FIG. 3 by the carriage until the left end plate 57 engages an adjustable stop 108 (FIG. 7) on the plate 49. To this end, a double acting cylinder 109 is secured to an upstanding side plate 110 of the plate 49 and has piston rods 111 extending from both ends and adjustably secured to the end plates 57. By introduction of pressure fluid to the left end of cylinder 109, the carriage is moved to the right as seen in FIG. 7 until the left end plate 57 engages the stop 108 and the wheel set U is located as seen in FIG. 3. At this time, however, the bearing pulling unit 14 is in its vertical position seen in phantom in FIG. 3.

Figure 16:
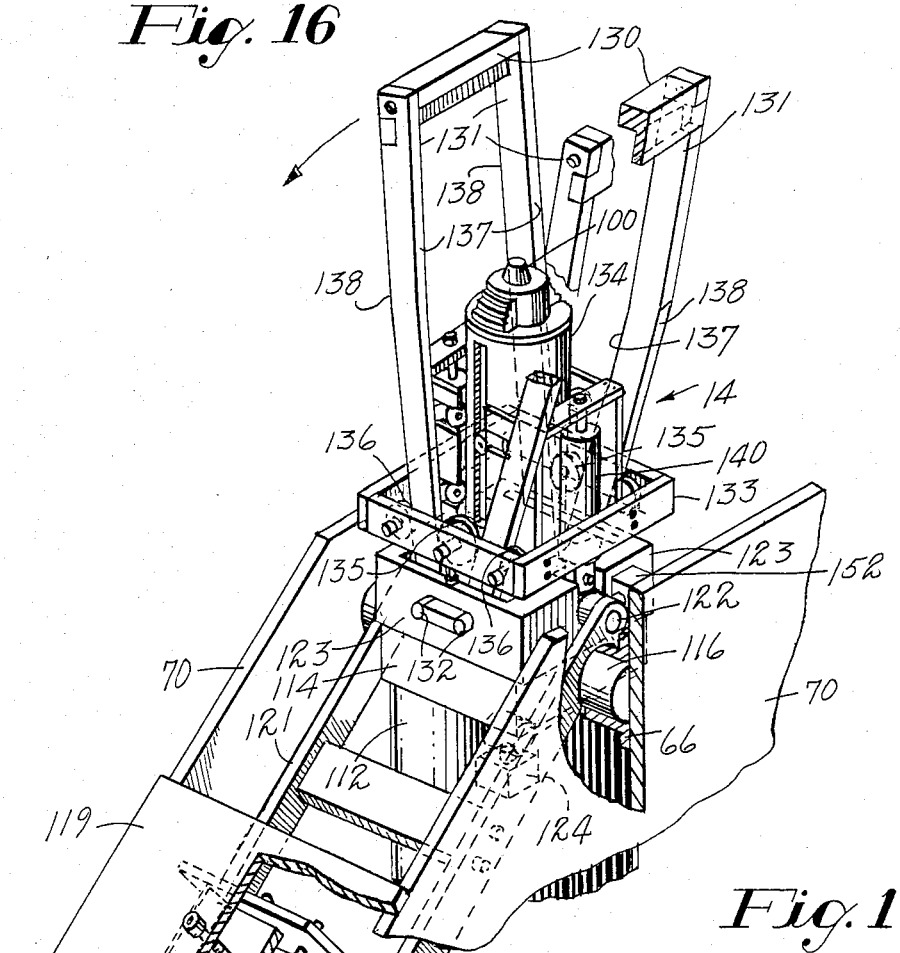
FIG. 16 is a perspective view showing the bearing pulling unit in vertical position for depositing a bearing.
Figure 17:
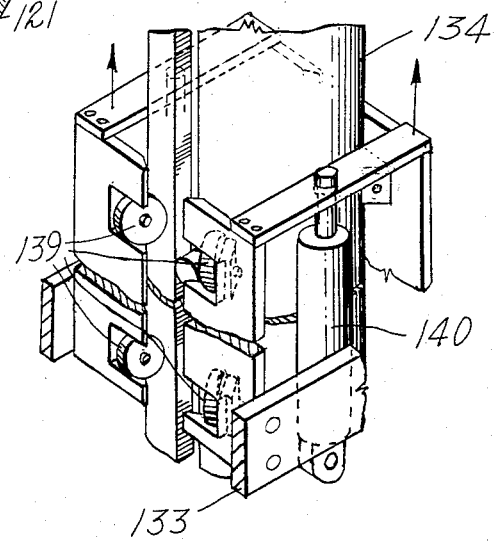
FIG. 17 is a fragmentary perspective view of part of the mechanism for operating the bearing jaws.

The unit 14 includes a ram cylinder 112 having a head 114 (FIGS. 14, 15 and 16) provided with trunnions 116 pivoted in extensions of the side frames 70. For swinging the unit 14 from the position shown in FIGS. 1, 2 and 16 to that shown in FIG. 3, a fluid operated rotary actuator 118 (FIGS. 3 and 16) is secured to a cross plate 119 extending between the side frames 70. The actuator is provided with a pair of crank arms 120 connected by links 121 to pins 122 projecting from a block 123 secured to the ram cylinder head 114. At this time the rotary actuator is operated to swing the crank arms 120 clockwise from the positions shown in FIG. 16 to that shown in FIG. 3. An adjustable stop 124 engages pin 122 to locate the unit 14 aligned with the wheel set U as seen in FIG. 3. During the downwrd swing of unit 14, a pair of jaws 130 in open condition as seen in FIG. 16 move down to the position seen in FIG. 14 and then are closed behind the bearing B. To this end the jaws are each mounted on a pair of arms 131 which are pivoted at 132 on the block 123 attached to the head 114 of the ram cylinder (see also FIG. 18). For closing the jaws a box-like frame 133 is mounted to move lengthwise of a support tube 134 extending from the block 123. The frame 133 is provided with rolls 139 engaging the tube and with rollers 135, 136 acting on surfaces 137, 138, respectively. To open and close the jaws, the frame 133 is reciprocated along the tube 134 by cylinders 140 secured to the block 123 with the piston rods secured to the frame 133. Movement of the frame 133 to the left as seen in FIG. 10 acts through the rolls 135, 136 acting on surfaces 137, 138 of the arms 131 to close the jaws 130 behind the bearing B while movement of the frame to the right acts to open the jaws.

As seen in FIG. 14, the center 100 is yieldably mounted in the end of an arbor 142 which is secured to the end of a piston rod 144 extending from the ram cylinder 112. A pair of arcuate bearing support fingers 146 extend from a friction ring 145 slidable along the arbor tube and having a roll 147 riding in a slot 148 in the support tube 134 to guide the fingers. Pressure fluid from an appropriate source, not shown, fed to the outer end of the ram cylinder 112 moves the arbor tube 142 to the left as seen in FIG. 14 until the center engages and aligns the axis of unit 14 precisely with the axle and bearing B. A sensor 150 associated with the frame 133 detects sufficient movement of the frame to close the jaws 130 behind the bearing and permits continued movement of the ram arbor to force the axle to the left as seen in FIG. 15 to pull the bearing held by the jaws from the axle. At this time, the removed bearing is supported by the jaws 130 and the fingers 146 which have stepped ledges which fit within bearings of different diameters. Application of pressure fluid to the right end of cylinder 109 of the carriage as seen in FIG. 7 until the left end plate 57 engages an adjustable stop 151 ensures removal of the axle from the center and locates the wheel axle unit U for removal of the bearing B from the other end of the axle as will appear.

The pulling unit 14 with the bearing held by the jaws 130 and fingers 146 is swung up to the position seen in FIG. 2 by return of the rotary actuator and its associated crank arms 120 and links 121 working through the pins 122. An adjustable stop 152 acts against the pins 122 to accurately locate the unit 14 in its vertical disposition. As the unit 14 approaches its final vertical condition, the jaws 130 are opened leaving the bearing supported only on the fingers 146 as seen in FIG. 18 with the arbor 142 and fingers 146 passing freely through a slot 160 in a plate 161 of the escapement unit 18. The ram cylinder 112 then is reversed retracting the arbor 142. Engagement of a shoulder on the fingers with the end of the support tube 134 while the arbor 142 continues to retract causes the fingers to be reset to their initial location.

Figure 20:
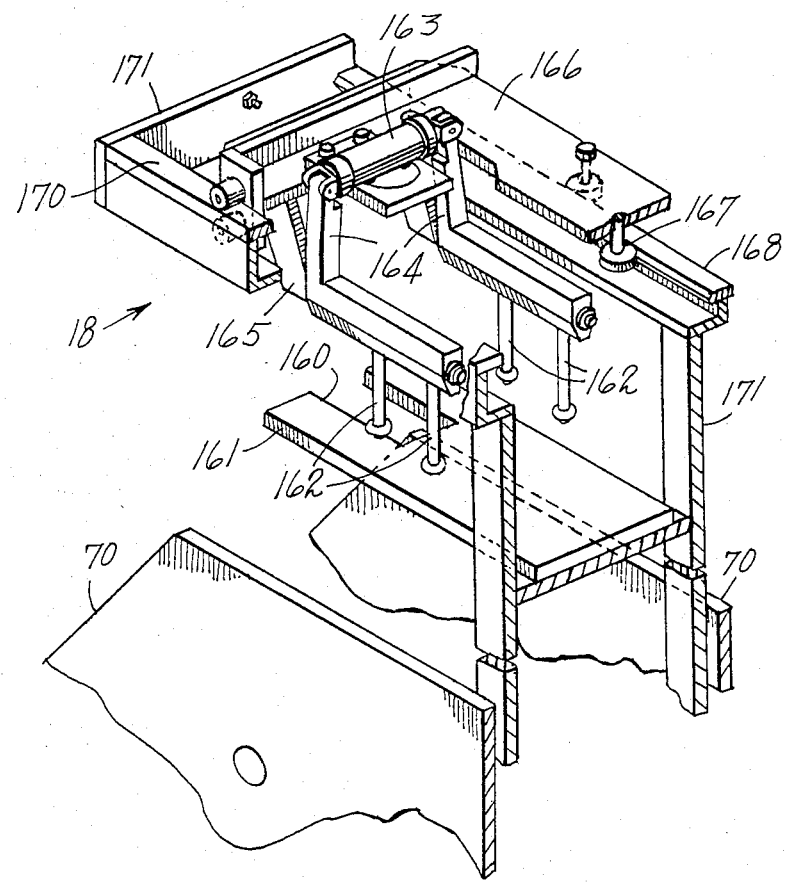
FIG. 20 is a rear perspective view of the escapement mechanism.

Fingers 162 (FIGS. 18–20) depending from levers 164 are swung in by action of a cylinder 163 to grip the bearing and slide the bearing along the plate to conveying means 20 which is not shown in detail but which may be in the form of a roll conveyor. To this end, the levers 164 are pivoted on bars 165 depending from a frame 166 which is mounted for reciprocation on grooved rollers 167 which roll along bars 168 and on rolls 169 which straddle bars 170. The bars 168, 170 are carried by a frame 171 secured to the upper ends of the side frames 70. At this time, the carriage 12 is swung, as seen in FIG. 10, 180° to present the bearing B at the other end of the axle for removal and the pulling unit 14 is returned to the location shown in FIG. 3. The jaws 130 are closed, and the ram cylinder is operated to remove the other bearing. The pulling unit 14 is again swung up in the same manner as above described and the bearing is removed by the escapement fingers. At the same time, the carriage 12 is returned to its centered condition seen in FIG. 2. For centering the carriage, there is provided a cylinder 172 secured to an upstanding side plate 173 of the plate 49. A piston rod 174 extends from the cylinder 172 and is adjustably secured to one of the end plates 57. Pressure fluid fed to the left end of cylinder 72 acts to center the carriage 12 and the wheel set. The cylinder 34 is pressurized at this time to raise the control bar 32 to the phantom position shown in FIG. 9 and the cylinder 40 is actuated to lower the wheel axle unit until the wheels W engage the sloping control bar 32 and the wheels roll out of the machine onto the tracks T.

BEARING INSTALLING UNIT

It should be understood that the machine may easily be converted to initially install bearings on the axle ends or to replace those removed as above described. To this end, the pulling jaws 130 and their operating mechanism (FIG. 14) are removed and the arbor 142 and fingers 146 are replaced with an arbor 190 of the same diameter as the inside diameter of the new bearing. Since the bearing usually includes a number of loose parts, the arbor 190 is adapted to receive all the parts. The support tube 134 of the pulling unit also is replaced by a ram installing tube 191 which slidably receives the new arbor 190 and is connected to the ram piston rod 144 instead of the arbor which is urged outwardly of the tube by a separate cylinder 192.

In the operation of the machine in the bearing installing mode, a bearing to be installed is conveyed to the escapement fingers 162 which grip the bearing and transport it to the location seen in FIG. 21. The parts of the bearing are held together frictionally by a removable tube and the multi-part bearing is located by the fingers in line with the arbor 190. A backup plate 193 mounted on the piston rod of a cylinder 194 which are added to the escapement for the installing mode unit is lowered onto the bearing and the arbor 190 is raised by the cylinder 192. The arbor is thus moved into the bearing until the end of the installing tube 191 also engages the underside of the bearing, the removable tube being pushed up out of the bearing assembly by the advancing arbor 190. The escapement fingers 162 (FIG. 20) are moved apart releasing the bearing and the unit is swung down by the rotary actuator 118 in the same manner as above described with reference to the pulling mode. The arbor 190 with the bearing thereon is aligned with the axle by the stop 124 in the usual way.

The wheel axle unit to which new bearings are to be applied is measured, elevated and swingably handled in the same manner as described above with reference to the bearing removing mode. However, only the centering cylinder 172 (FIG. 7) is used to locate the wheel set which remains substantially in the loction seen in FIG. 2. With the wheel set U aligned with the installing arbor, the arbor 190 is again advanced engaging the center 100 with the end of the axle for precise alignment. Operation of the ram cylinder 112 moves the tube 191 to the left as seen in FIG. 21 moving the other end of the axle against an abutment 195 which is removably pivoted at 196 to the side frames 70 and adjusted by a reaction bolt 197. Continued operation of the ram cylinder 112 forces the bearing on the axle by the tube 191 the arbor cylinder 192 at this time being exhausted as the tube advances. When the bearing is fully installed on the axle the action of the ram cylinder and arbor cylinder are reversed and the tube and arbor are retracted to their initial positions with the center 100 disengaged from the axle. The cylinder 172 (FIG. 7) is actuated to center the wheel set and the rotary actuator 41 (FIG. 4) is operated to swing the carriage and wheel set 180° to present the other end of the axle to the installing unit. Another bearing is picked up by the arbor 190 at the escapement and installed on the axle in the same manner as above described. After the installing arbor is retracted, the carriage is again centered and by operation of cylinder 40 (FIG. 4), the wheel set is lowered onto the rails 32 and rolled out of the machine on tracks T.

Thus, it may be seen that by installing either bearing removal unit parts or installing parts, the versatility of the machine is greatly enchanced without substantial conversion expenditures or requiring additional costly machines. While not shown, it should be apparent that a wide variety of well-known fluid or electrically or electronically operated controls and devices could be used to operate and control the machine without departing from the scope of the invention. While the mechanisms described show preferred embodiments it should be obvious that a wide variety of well known devices could be substituted for those described without departing from the scope of the invention defined by the following claims:

I claim:

1. In a machine for operating on bearings at opposite ends of wheel sets comprising an axle having a pair of railroad wheels press fitted thereon, the improvement comprising means for locating the axis of each wheel set in a particular plane; a gage having a probe movable along said plane into engagement with the periphery of at least one of the wheels for locating the axis of the wheel set, the gage including a gage plate having a secondary probe swingable about the point of engagement of the first named probe into engagement with the wheel periphery at a spaced location, a gaging surface assuming an angular disposition depending on the extent of swinging movement of the gage plate indicative of the location of the wheel set axis; a unit having a centerline for operating on the bearings of the wheel set; and an assembly for moving the wheel set along said plane a predetermined distance depending on the gaged location of said axis for aligning the wheel set axis with the centerline of operation of said unit.

2. A machine according to claim 1 in which the gage also has a switch movable with movement of the assembly and actuated by engagement with the gaging surface to control the extent of movement of the assembly.

* * * * *